June 25, 1929.   F. C. KRONAUER   1,718,366
RAIL JOINT
Filed Aug. 24, 1928
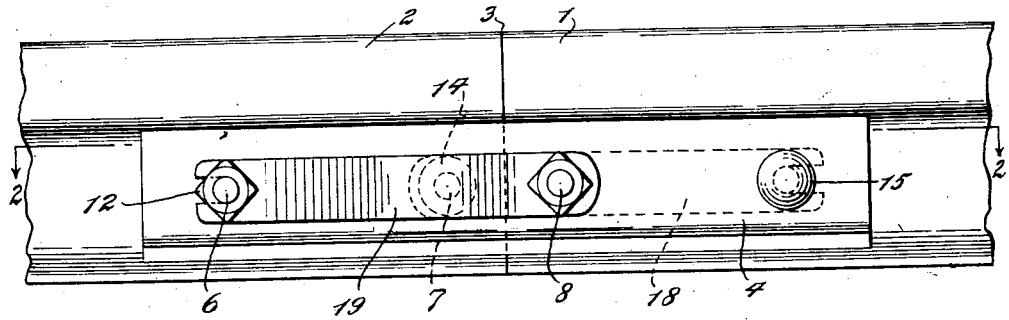
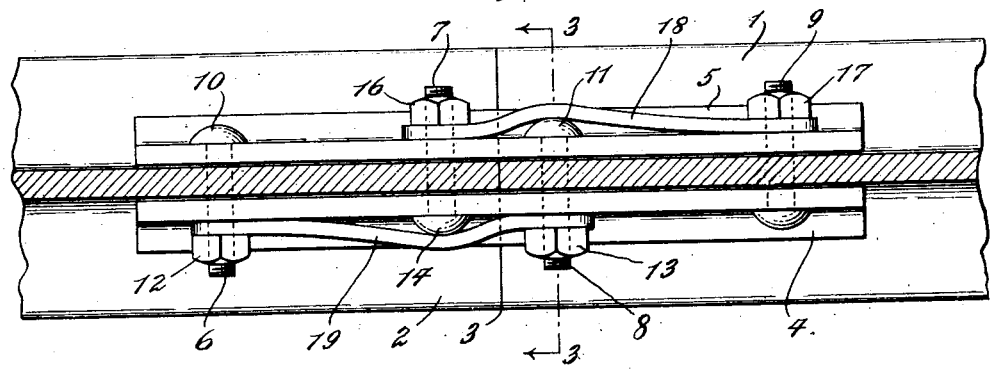
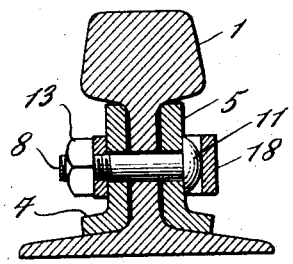
INVENTOR
Frank C. Kronauer
BY
Gifford & Bull
ATTORNEYS Patented June 25, 1929.

1,718,366

UNITED STATES PATENT OFFICE.

FRANK C. KRONAUER, OF GLEN ROCK, NEW JERSEY, ASSIGNOR TO THE NATIONAL LOCK WASHER COMPANY, OF NEWARK, NEW JERSEY, A CORPORATION OF NEW JERSEY.

RAIL JOINT.

Application filed August 24, 1928. Serial No. 301,828.

My invention relates to rail joints and will be understood by reading the following description taken in connection with the accompanying drawings showing one embodiment of my invention, and in which Fig. 1 is a side elevation of a joint embodying my invention;

Fig. 2 is a top plan view of a joint embodying my invention; and

Fig. 3 is a cross section on line 3—3 of Fig. 2.

Referring to the drawings, two rail ends 1 and 2 are placed adjacent each other with a joint 3 therebetween. The rails 1 and 2 may be of any desired size and shape. Preferably, fish plates 4 and 5 are placed against the sides of the rails and overlapping the joint 3. The fish plates and the rails are provided with openings through which bolts 6, 7, 8 and 9 pass as shown in the drawings. It will be noted that the bolts 6 and 8 have their heads 10 and 11 on the same side of the rail and are provided with nuts 12 and 13 on the other side of the rails. Likewise the bolts 7 and 9 have their heads 14 and 15 on the same side of the rails and are provided with nuts 16 and 17 on the other side of the rails. The bolts 7 and 8, which are adjacent the joint 3, have their heads and nuts on the opposite side of the rail, as shown in Fig. 2.

In order to strengthen the joint and increase its safety, spring members 18 and 19 are placed on the side of the fish plates as shown. The spring 18 is provided at one end with an opening through which the bolt 7 passes. The other end of the spring 18 is provided with a somewhat elongated slot or opening through which the bolt 9 passes. Since the bolts 7, 8 and 9 are in alinement the spring 18 engages the head of the bolt 8 and when the nuts 16 and 17 are drawn down into final position the spring 18 bears against the head 11 and puts a tension on the bolts 7 and 9 and compression on the head 11.

The spring 19 has an opening through one end through which the bolt 8 passes and a somewhat elongated slot or opening in the other end through which the bolt 6 passes. The nuts 12 and 13 when drawn down into position force the spring 19 into the position shown in Fig. 2 whereby tension is placed on the bolts 6 and 8 and compression on the head 14 of the bolt 7. The distance between the bolts 7 and 8 being less than that between the bolts 8 and 9 and that between the bolts 6 and 7 causes the heads 11 and 14 to fall at unequal distances from the ends of the springs 18 and 19, respectively. This puts relatively large tension effort on the bolts 7 and 8 and tends to strengthen the joint and the springs 18 and 19 also act to prevent the nuts 12, 13 16 and 17 from backing off of their respective bolts.

The arrangement of the bolts and the springs above described results in a factor of safety because should the nut 13 back off the bolt 8 it will be impossible for the bolt to come out of the opening through the rails and fish plates because of the action of the spring 18 upon the head 11 of the bolt. For the same reason it would be impossible for the bolt 7 to come out of its opening if the nut 16 should back off of the bolt. By the arrangement above shown and described, it therefore becomes apparent that each of the spring members acts upon three bolts, two of which are adjacent and on opposite sides of the joint and the third of which is somewhat removed from the joint.

The spring members may be of any desired size and shape and if desired more than two bolts may be passed through each spring or other similar modifications in the construction shown and described may be employed without departing from the spirit of my invention.

The springs 18 and 19 may be so constructed that sufficient tension is placed on the bolts 6, 7, 8 and 9, and sufficient pressure created on the bolt heads 11 and 14 without the necessity of drawing the ends of the springs 18 and 19 up tight against the fish plates by the nuts 16 and 17 and 12 and 13, respectively. Since among the purposes of the construction disclosed in this application are compensation for wear and tear on the bolted parts and cushioning shocks caused by passing trains, there might be occasions where it would be of advantage not to screw all or certain of the nuts 12 and 13, 16 and 17 down so tight against the ends of the springs 19 and 18, respectively, that the ends of springs are in contact with fish plates.

I claim:

1. In a rail joint, the combination of fish plates overlapping the joint between rails, bolts passing through the rails and fish plates on both sides of the joint and spring means on one side of the rails overlapping the joint and acting in opposite directions on the two bolts adjacent the joint.

2. In combination, two rail ends with a joint between, fish plates overlapping the joint, bolts passing through said fish plates and rails on both sides of said joint, the bolts adjacent said joint having their heads on opposite sides of the rails and a spring means having one end held by the bolt on one side the joint and passing over the head of the bolt on the other side of the joint and means for holding the other end of the spring adjacent the side of the rail.

3. In combination, two rail ends with a joint between, fish plates overlapping said joint, bolts passing through said plates and rails, spring means having one end held adjacent a rail side by one bolt and passing over the end of the bolt on the opposite side of the joint and means for holding the other end of the spring adjacent the rail side.

4. In combination, two rail ends having a joint between, fish plates overlapping said joint, bolts passing through said plates and joints and spring means engaging a plurality of said bolts and acting in reverse direction upon alternate bolts engaged by it.

5. In combination, two rail ends having a joint between, fish plates overlapping said joint, bolts passing through said plates and rails, a spring member on each side of the rails, said springs acting in the same direction on the two bolts adjacent the joint.

6. In combination, two rail ends having a joint between, fish plates overlapping said joint, four bolts passing through said rails, a spring on each side of said rails, both of said springs acting on the two intermediate bolts and each acting separately on the outside bolts.

7. In combination, two rail ends with a joint between, bolts passing through said rails and a spring having its ends held against the side of the rails, one end on each side of the joint and an intermediate portion of said spring passing over the end of another of said bolts.

8. In combination, two rail ends with a joint between, fish plates overlapping said joint, bolts passing through said plates and rails and springs on each side of said rails, each of said springs having one end held adjacent said rails on one side of the joint and the other on the other side of the joint and an intermediate part passing over the end of another of said bolts.

FRANK C. KRONAUER.